United States Patent
Vickrey et al.

(10) Patent No.: US 10,353,963 B2
(45) Date of Patent: Jul. 16, 2019

(54) FILTERING AUTOMATED SELECTION OF KEYWORDS FOR COMPUTER MODELING

(71) Applicant: Facebook, Inc., Menlo Part, CA (US)

(72) Inventors: David Vickrey, Mountain View, CA (US); Jeffrey William Pasternack, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 1063 days.

(21) Appl. No.: 14/577,945

(22) Filed: Dec. 19, 2014

(65) Prior Publication Data

US 2016/0180246 A1 Jun. 23, 2016

(51) Int. Cl.
*G06F 16/951* (2019.01)
*G06N 20/00* (2019.01)

(52) U.S. Cl.
CPC .......... *G06F 16/951* (2019.01); *G06N 20/00* (2019.01)

(58) Field of Classification Search
CPC ..................................................... G06F 16/951
See application file for complete search history.

(56) References Cited

U.S. PATENT DOCUMENTS

| | | | | |
|---|---|---|---|---|
| 8,504,550 | B2* | 8/2013 | Hall | H04L 51/32 707/710 |
| 2004/0162795 | A1* | 8/2004 | Dougherty | G06F 17/30707 706/20 |
| 2010/0153318 | A1* | 6/2010 | Branavan | G06F 17/241 706/12 |
| 2013/0159233 | A1* | 6/2013 | Mason | G06N 5/00 706/45 |
| 2016/0092771 | A1* | 3/2016 | Buckley | H04L 67/02 706/52 |

OTHER PUBLICATIONS

Bhagat, Smriti et al.; "Applying Link-based Classification to Label Blogs"; 2007; ACM; Joint 9th WEBKDD and 1st SNA-KDD Workshoop '07; pp. 92-101. (Year: 2007).*
Yih, Wen-tau et al.; "Finding Advertising Keywords on Web Pages"; 2006; ACM; WWW 2006; pp. 213-222. (Year: 2006).*

(Continued)

*Primary Examiner* — Stanley K. Hill
(74) *Attorney, Agent, or Firm* — Fenwick & West LLP (57) ABSTRACT

A social networking system receives messages from users that include links to webpages that designate keywords of the webpage. The social networking system identifies webpages linked by users to generate computer models that predict whether a webpage or message should be associated with particular keywords. The social networking system generates computer models that are trained on example webpages and related keywords linked by users in messages. Prior to generating computer models, the social networking system applies one or more filters to exclude webpages and keywords from consideration. The filters may exclude webpages that have low-reliability, are associated with an excessive number of keywords, or keywords that appear on an insufficient number of domains. After training the computer models, messages composed by users may be analyzed and a keyword predicted for the message, which may be suggested to the user to categorize the message.

24 Claims, 4 Drawing Sheets

(56) References Cited

OTHER PUBLICATIONS

Turney, Peter D.; Coherent Keyphrase Extraction via Web Mining; 2003; Institute for Information technology; 6 pages. (Year: 2003).*

Wan, Xiaojun et al.; CollabRank: Towards a Collaborative Approach to Single-Document Keyphrase Extraction; Proceedings of the 22nd International Conference on Computational Linguistics (Coling 2008); pp. 969-976. (Year: 2008).*

Witten, Ian H. et al.; KEA: Practical Automatic Keyphrase Extraction; 9 pages. (Year: 2005).*

Turney, Peter D.; Learning Algorithms for Keyphrase Extraction; Kluwer Academic Publishers; Information Retrieval, 2, 303-336, 2000. (Year: 2000).*

Sriram, Bharath et al.; Short Text Classification in Twitter to Improve Information Filtering; 2010 ACM; SIGIR'10; pp. 841-842. (Year: 2010).*

Weston, J. et al., "#TagSpace: Semantic Embeddings from Hashtags," *Proceedings of the 2014 Conference on Empirical Methods in Natural Language Processing (EMNLP)*, Oct. 25-29, 2014, pp. 1822-1827, Doha, Qatar.

\* cited by examiner

| Keyword Data Table 500 |||
|---|---|---|
| Keyword | Page | Domain |
| Politician | SFNews.com/politician | SFNews.com |
| San Francisco | SFNews.com/politician | SFNews.com |
| Giants | SFNews.com/giants | SFNews.com |
| San Francisco | SFNews.com/giants | SFNews.com |
| Giants | Sports.com/giantsgame | Sports.com |
| San Francisco | Sports.com/giantsgame | Sports.com |
| Article ID 1358 | Sports.com/giantsgame | Sports.com |
| Aardvark | Spamsite.com/frontpage | Spamsite.com |
| Abalone | Spamsite.com/frontpage | Spamsite.com |
| Able | Spamsite.com/frontpage | Spamsite.com |
| | Spamsite.com/frontpage | Spamsite.com |

FIG. 5

FILTERING AUTOMATED SELECTION OF KEYWORDS FOR COMPUTER MODELING

BACKGROUND

This invention relates generally to identifying content in messages, and in particular to training computer models for identifying keywords for web pages linked in a message.

Users may add links to external webpages in posts to a social networking system. These webpages may relate to a variety of different topics. For example, a user may insert link to a webpage discussing a recent sports game or the user's favorite team. The webpages linked by the user typically relate to these various topics which may or may not be represented in the social networking system. Without an understanding of the topics or other terms relating to the webpage, the social networking system may not be able to associate the webpage to concepts of the social networking system. While certain webpages may identify "keywords" associated with the webpage, typically used for search engine analysis, many webpages have no keywords. Webpage keywords may be designated by operators of the webpage and are often unreliable. As a result, keyword data for a webpage is very noisy, and correctly analyzing keywords for association with a message in a social networking system is difficult. In particular, it is challenging to determine which keywords may be successfully predicted using a classifier or computer model.

SUMMARY

A social networking system receives messages and other content items that include a link to webpages that include keywords. The webpage keywords are typically included as a non-renderable portion of a webpage, for example in a metadata portion of a markup document. The keywords are typically provided by the operator of the webpage, and may be automatically generated by a system of the operator, or may be added manually by the operator. keywords. The social networking system performs analysis of these keywords to determine whether keywords may be associated with a message linking to a webpage. In particular, the social networking system can associate a keyword with a message that links to a webpage that does not expressly include the keyword, and may also associate the keyword with a message based on the content of the message, even if the message does not link to a webpage.

The social networking system trains computer models to identify when a keyword is applicable to a message that does not have a link to a website with that keyword. The social networking system may generate thousands, tens of thousands, or more keyword computer models automatically in order to perform this analysis. In order to generate computer models that are meaningful and relevant to the user, the webpages containing keywords and the keywords to be identified maybe filtered to generate a set of keywords eligible for training The filters generally exclude keywords that would be difficult to train or likely would not produce useful results. As example filters, a webpage may be excluded when the webpage belongs to a blacklisted domain. As another example, a keyword may be excluded for a webpage when it appears on more than a threshold percentage of the webpages on a domain of the webpage. Additionally, a keyword may be excluded for a webpage when the keyword does not appear on a sufficient number of webpage domains.

For the keywords that remain after the filters, a keyword model may be trained for each keyword using, as an input to the training, the remaining webpages associated with the keyword and the messages that include the remaining webpages. The social networking system may use the keyword models to predict whether a keyword should be associated with a message or a webpage that is not labeled with the keyword. For example, the keyword may be suggested to the user for inclusion in the message when a user composes the message, or the keyword may be used to associate the message with the topics or social networking objects associated with the keyword. This association may be used for various purposes in the social networking system, such as a tailoring a newsfeed for a user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
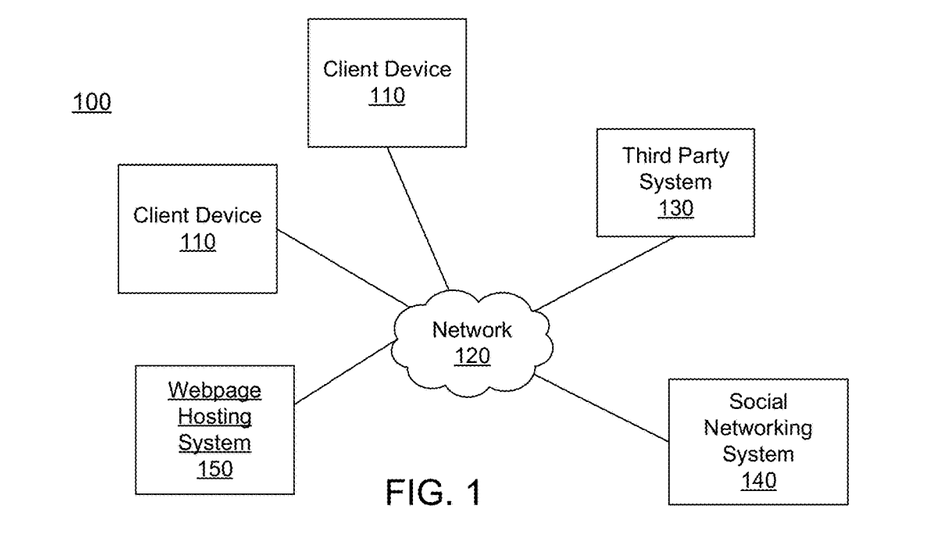
FIG. 1 is a high level block diagram of a system environment for a social networking system.

FIG. 1 is a high level block diagram of a system environment 100 for a social networking system 140. The system environment 100 shown by FIG. 1 comprises one or more client devices 110, a network 120, one or more third-party systems 130, a social networking system 140, and a webpage hosting system 150. In alternative configurations, different and/or additional components may be included in the system environment 100. The embodiments described herein can be adapted to online systems that are not social networking systems. The social networking system 140 analyzes messages and other user interactions to identify topics, social networking objects, and other aspects of a message to better understand user behavior and interests.

The social networking system 140 provides analysis and prediction of keywords in webpages linked in messages within the social networking system 140. A message as used herein is a portion of a content item that includes a string of textual characters. For example, messages may be included in a status update, a photo description, or a check-in, among other example content items further described below. The social networking system 140 analyzes the message to determine associated keywords for a message, for example to better determine the topics or interests associated with the message, as well as to make predictions of the keywords that may be applied to a message. The keyword analysis may also be applied to customize content for a user, for example to customize a newsfeed or other content for a user based on keywords that the user has used and the topics associated with those keywords.

A message may include a link to a webpage, for example a link to <sportschannel.com/raiders/>. The webpage is typically hosted at an external location, such as the webpage hosting system 150. The webpage is typically described with a domain and a path. The domain is a portion of a webpage address that indicates a location of a resource on a network, such as the webpage hosting system 150. The path indicates, within that domain, a particular directory or other organizational location of a desired item. In the example above, "sportschannel.com" is the domain and "/raiders/" is the path of the webpage.

The webpage may include various types of information, such as a title, summary, webpage content, and keywords. The keywords are individual terms intended to summarize or describe the webpage. For example, a webpage that includes a news article about a basketball game between two teams may include the name of the basketball teams, key players of the teams, the location of the game, and so forth as keywords for the webpage. The keywords may be included as a portion of the webpage that is normally not displayed to the user. For example, the webpage may be a markup language document, and the keywords may be listed in a portion of the markup language document that is not provided to the user, for example in a metatag portion of the markup language document.

The social networking system 140 generates computer models to identify keywords that may be applicable to a message. The social networking system 140 generates a computer model for a subset of all keywords included in webpages linked in messages, and applies filters to exclude webpages and keywords from the subset of keywords based on various attributes of the keywords and webpages. These filters prevent overselection of keywords in the predictions for keywords that may be applied to a message. Without these filters, there is a risk that a message will be associated with keywords that are not interesting to users of the social networking system, and may inaccurately suggest these keywords for a user to use with a message.

These features of the social networking system 140 are described in further detail below and with respect to the accompanying figures.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content, advertising, or other information for presentation via a client device 110.

Figure 2:
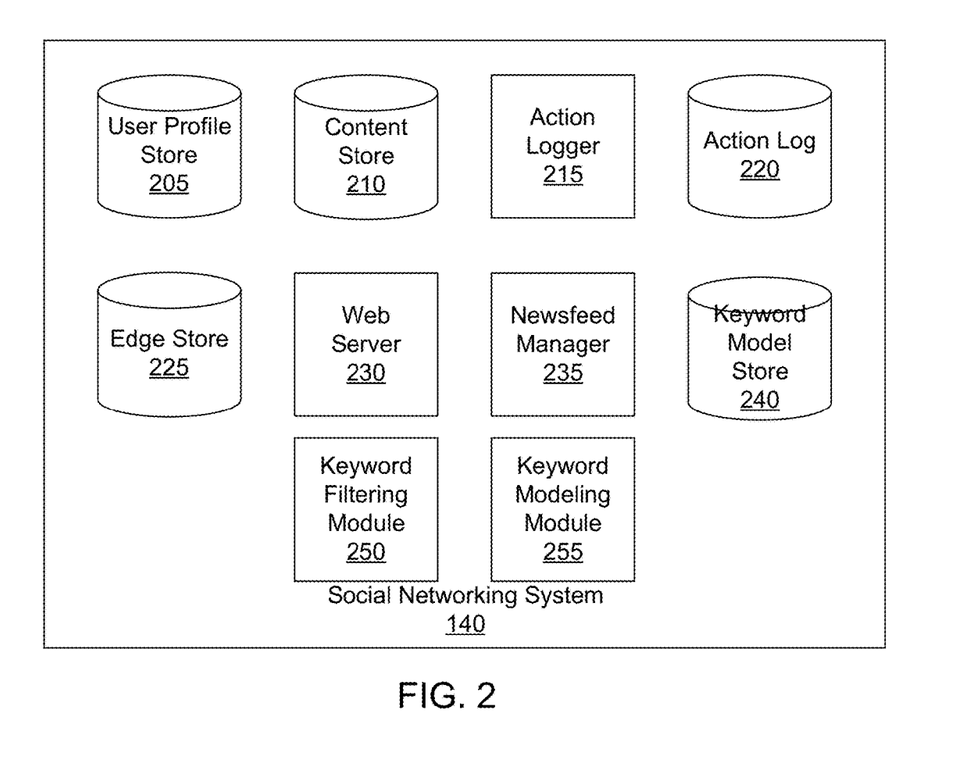
FIG. 2 is an example block diagram of an architecture of the social networking system.

FIG. 2 is an example block diagram of an architecture of the social networking system 140. The social networking system 140 shown in FIG. 2 includes a user profile store 205, a content store 210, an action logger 215, an action log 220, an edge store 225, web server 230, newsfeed manager 235, keyword model store 240, keyword filtering module 250, and keyword modeling module 255. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

In addition to user-provided information, the social networking system 140 may also receive information from third parties describing users of the social networking system. For example, the social networking system 140 may receive information from a data aggregator that collects demographics, purchasing, and advertising information about users. This information may be stored by the social networking system 140 and used in analyzing groups of customers as an audience for an advertiser. The purchasing information may indicate, for example, that a user is considered in-market for a particular item, or that a user has recently purchased specific items. The information received from data aggregators may be partially anonymized from the data aggregator, and prevent specific identification of social networking system users. For example, a data aggregator may describe characteristics of a group of individuals, rather than specific individuals within the group.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups, or applications. In some embodiments, objects are received from third-party applications or third-party applications separate from the social networking system 140. In one embodiment, objects in the content store 210 represent single pieces of content or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user profile of the user and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the content store 210. An advertisement request includes advertisement content and a bid amount. The advertisement content is text, image, audio, video, or any other suitable data presented to a user. The advertisements may include an advertisement to purchase a restricted gift for another user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 235 may generate stories for presentation to a user based on information in the action log 220 and in edge store 225 or may select candidate stories included in content store 210. One or more of the candidate stories are selected and presented to a user by the newsfeed manager 235.

For example, the newsfeed manager 235 receives a request to present one or more stories to a social networking system user. The newsfeed manager 235 accesses one or more of the user profile store 205, the content store 210, the action log 220, and the edge store 225 to retrieve information about the identified user. For example, stories or other data associated with users connected to the identified user are retrieved. The retrieved stories or other data is analyzed by the newsfeed manager 235 to identify content likely to be relevant to the identified user. For example, stories associated with users not connected to the identified user or stories associated with users for which the identified user has less than a threshold affinity are discarded as candidate stories. Based on various criteria, the newsfeed manager 235 selects one or more of the candidate stories for presentation to the identified user.

In various embodiments, the newsfeed manager 235 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 205. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 may also account for actions by a user indicating a preference for types of stories and selects stories having the same, or similar, types for inclusion in the newsfeed. Additionally, newsfeed manager 235 may analyze stories received by social networking system 120 from various users and obtains information about user preferences or actions from the analyzed stories. This information may be used to refine subsequent selection of stories for newsfeeds presented to various users.

The web server 230 links the social networking system 140 via the network 120 to the one or more client devices 110, as well as to the one or more third party systems 130. The web server 140 serves web pages, as well as other web-related content, such as JAVA®, FLASH®, XML, and so forth. The web server 230 may receive and route messages between the social networking system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS®, or RIM®.

The keyword model store 240 stores trained computer models that identify messages as belonging to keywords. Each computer model is associated with a keyword and receives a feature vector for a message and outputs a measure that the message belongs to the keyword. The feature vector may incorporate features of a webpage linked to in the message and portions of a character string associated with the message linking to the webpage. The computer model is trained by the keyword modeling module 255 based on a positive training set and a negative training set associated with the keyword. The computer model may be any suitable computer learning mechanism, such as a neural network, logistic regression, convolutional networks, and TagSpace. Further details regarding Tagspace are described in "#TagSpace: Semantic Embeddings from Hashtags" at the Proceedings of the 2014 Conference on Empirical Methods in Natural Language Processing, pp. 1822-1827, which is hereby incorporated by reference in its entirety. The feature vector for the message may comprise various information relating to the message, such as the content of the message, topics associated with the message, and various objects associated with the message. When the computer model outputs the measure that the message belongs to the keyword, the social networking system 140 may use the output to determine whether to suggest the keyword to the user for applying to the message, identifying a topic related to the keyword, or otherwise applying the keyword to the message.

The keyword filtering module 250 filters webpages and keywords that may be eligible for prediction by a keyword model. The keywords associated with linked webpages in messages are frequently uninteresting or low value and may not be suitable to generate a keyword model. In particular, these keywords may have a very low volume, such as unique or near-unique keywords, or keywords that are associated with terms that are not used by other domains. The keyword filtering module 250 implements one or more exclusionary filters that exclude certain keywords from being modeled. In addition, the keyword filtering module 250 may exclude certain webpages from consideration. This process is further described below with respect to FIGS. 3 & 4.

The keyword modeling module 255 selects, for the keywords eligible for modeling, a training set of data that includes messages and/or webpages that include the keyword as well as webpages and/or messages that do not include the keyword. The training set is used to train the keyword model for the keyword and store the keyword model in the keyword model store 240. The selection of a training set can be performed in an unsupervised manner, permitting a computer model to be trained for a keyword without further user intervention. As a result, the configuration of the keyword filtering module 250 ensures that those keywords that are modeled by the keyword modeling module 255 are more likely to be of interest. Once keywords are trained, the social networking system 140 may automatically apply the keywords to messages to identify keywords that may be relevant to a message, for example to prompt a user to tag a message with a keyword. The selection and exclusion of eligible keywords is particularly important to ensure that the keywords provided to the user as a suggestion is likely to be a keyword of some interest to the user.

Figure 3:
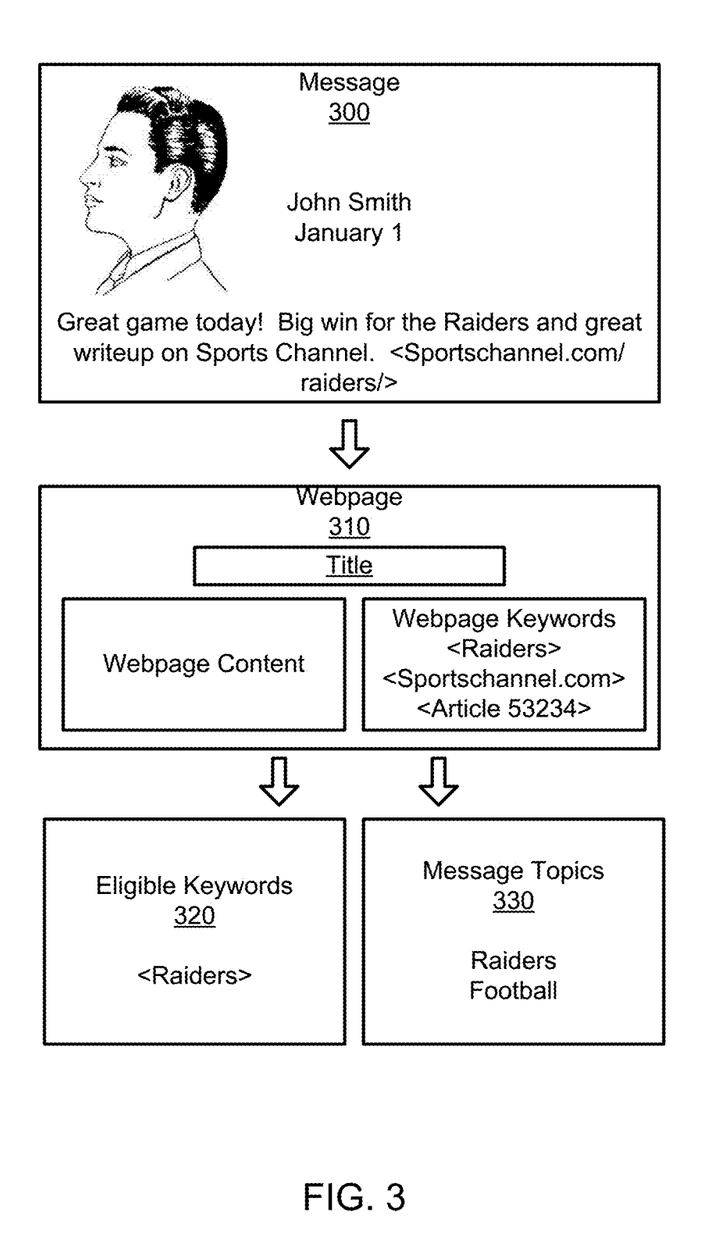
FIG. 3 shows an example application of the keyword identification and use in a message according to one embodiment.

FIG. 3 shows an example application of the keyword identification and use in a message according to one embodiment. As shown in FIG. 3, a user submits a message 300, which in this example is a status message by John Smith. The character string associated with the status message is "Great game today! Big win for the Raiders and great writeup on Sports Channel." The character string in this example includes a link to the webpage located at "sportschannel.com/raiders/."

The webpage 310 for sportschannel.com/raiders/ includes various components, in this example a title, webpage content, and webpage keywords. In some embodiments, the components described for webpage 310 are each portions of a markup language. Additional or fewer components may also be included in the webpage 310, such as the addition of additional tags for the webpage or the removal of the title.

In this example, the webpage includes several keywords, including "Raiders" "Sportschannel.com" and "Article 53234." As described further below, the keyword filtering module 250 may determine a portion of these keywords to exclude from the set of eligible keywords 320 associated with the message. The filters which perform this exclusion are described with respect to FIG. 4 below. In this example, "sportschannel.com" and "article 53234" are excluded from consideration as keywords associated with the webpage 310. The eligible keywords 320 may be used in a variety of ways. In one example, the message or webpage may be used as part of a feature vector for training a keyword model, and in particular for training a model to identify the eligible keywords 320 for the webpage 310.

The webpage 310 and message 300 may be provided as an input to a model or other prediction algorithm to identify message topics 330 associated with the message. The identified topics may be part of a defined set of topics, or the identified topics may correspond to objects in the social networking system. In this example, the message topics 330 may include the keywords of the webpage 310, in addition to keywords associated with the webpage after executing the keyword models to identify additional keywords that may apply to the message and/or webpage 310.

Figure 4:
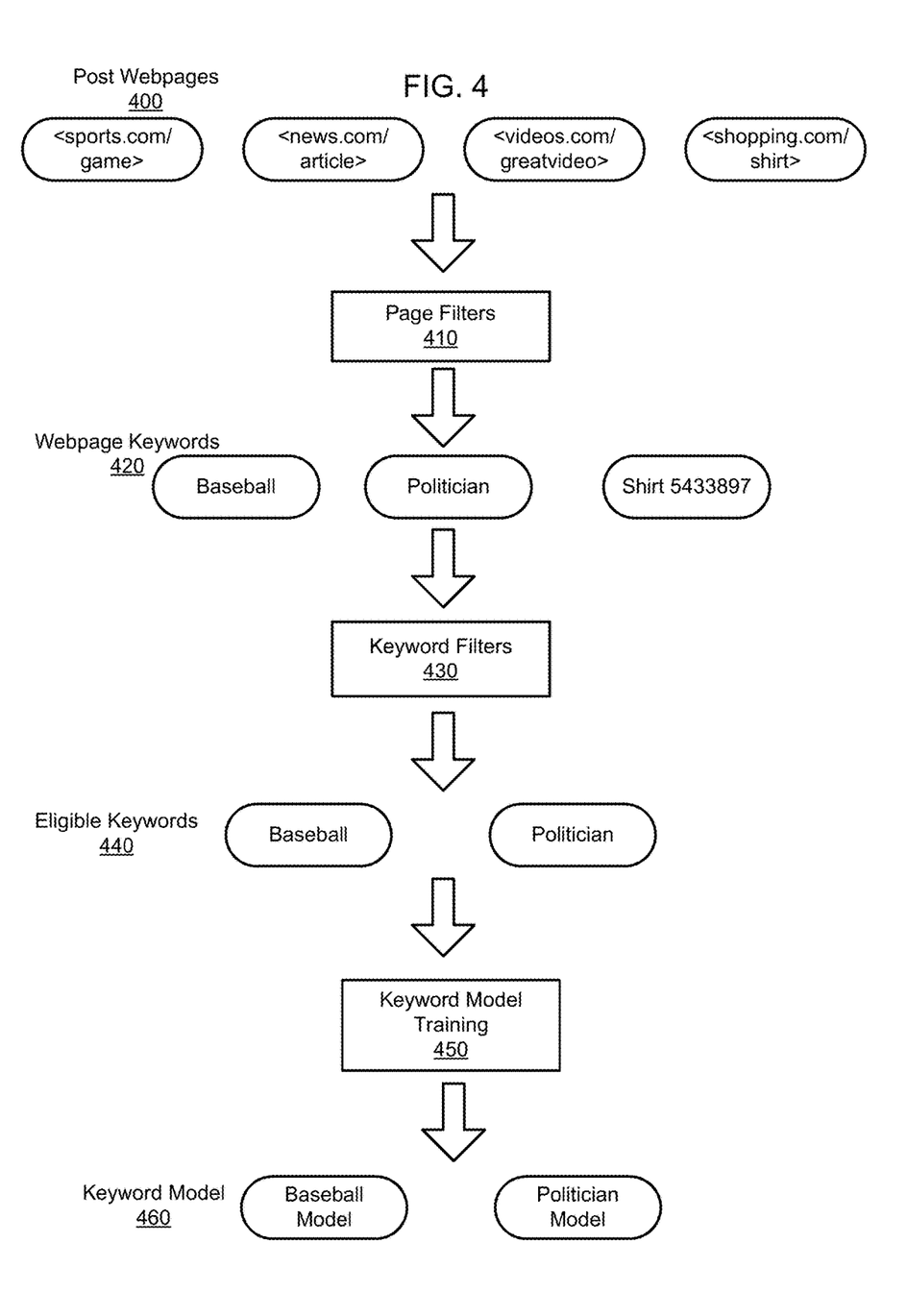
FIG. 4 shows the selection of eligible keywords and training of eligible keywords to generate keyword training models.

FIG. 4 shows the selection of eligible keywords and training of eligible keywords to generate keyword training models. The process shown in FIG. 4 may be performed by keyword filtering module 250 in conjunction with keyword modeling module 255. Initially, the messages in the social networking system 140 are associated with a set of post webpages 400. This set of post webpages 400 includes the set of webpages that have been linked by messages in the social networking system. A set of page filters 410 excludes from further keyword analysis any webpages that meet criteria of one or more filters of the page filters 410. One example filter excludes a webpage if it belongs to a domain on a domain blacklist. In certain cases, some domains provide keywords that are difficult to generalize. For example, certain domains may use computer models, classifiers, or other machine learning tools to automatically generate keywords for webpages within the domain. These keywords may be less reliable than keywords used by other webpages or manually added by users. Accordingly, these domains may be added to the blacklist in a page filter 410. In some examples, rather than selecting entire domains, the blacklist may designate specific webpages to exclude. In this example, videos.com/greatvideo may automatically label videos on the domain with specific keywords and exclude the page from consideration from which to select webpage keywords 420.

Figure 5:
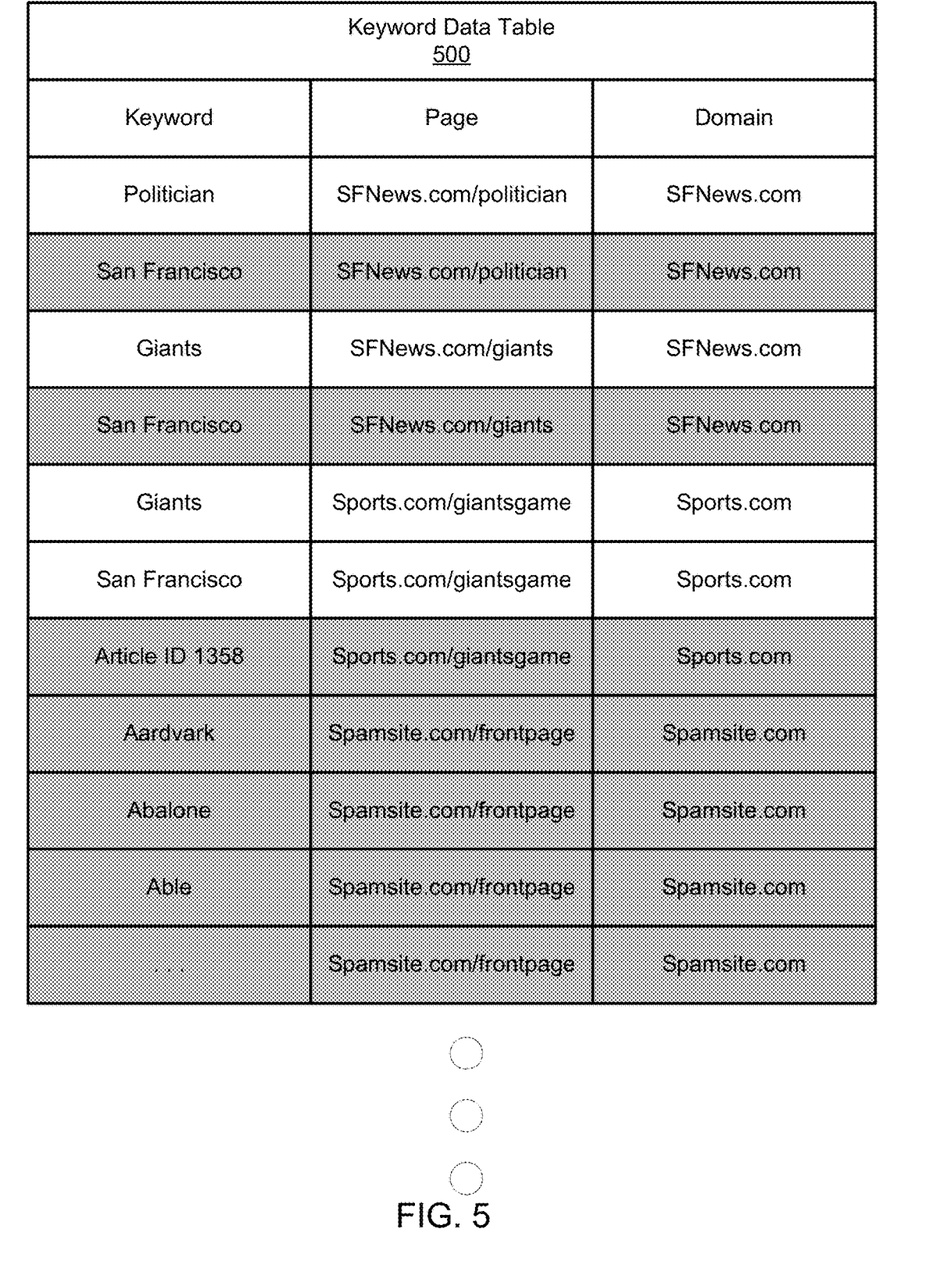
FIG. 5 shows an example keyword data table that may be generated by the keyword filtering module.

FIG. 5 shows an example keyword data table 500 that may be generated by the keyword filtering module 250. The keyword data table 500 provides an example of the data that may be maintained by the keyword filtering module 250 in determining webpages and keywords to filter. In certain embodiments, the keyword filtering module 250 does not maintain a specific keyword data table 500, and instead maintains data about keywords and webpages in another way. The social networking system 140 retrieves the webpage keywords 420 associated with the webpages. Each keyword may be associated with many webpages, which may also be on various domains. For example, a politician may be used as a key word on many different domains, such as various news sites. The keyword filtering module 250 identifies the webpages and associated domains where the keyword is used and stores this data in the keyword data table 500. The keyword data table 500 shown in FIG. 5 is used as an example for certain of the filters that follow.

The page filters 410 may also include a filter that excludes a webpage if that webpage appears has prohibited terms or keywords on the webpage. The prohibited terms may be vulgar, inappropriate, or otherwise improper, which may suggest that even if the webpage has other appropriate terms, the webpage as a whole should be excluded. An additional type of page filter 410 identifies the quantity of keywords associated with the webpage, and excludes webpages that include a number of keywords above a threshold. For example, this filter may exclude webpages that include more than 50 or 100 keywords. This filter may exclude webpages that are associated with an excessive number of keywords which suggests that the keywords may not be particularly relevant to the page. In the example of FIG. 5, the page "spamsite.com/frontpage" at domain "spamsite.com" is associated with a large number of keywords, and in this example exceeds the threshold for this filter. Accordingly, all keywords for this page are excluded, as shown the keyword data table 500 of FIG. 5.

Next, keywords are filtered by one or more keyword filters 430, which filter the keywords to a set of eligible keywords 440 for which computer models may be trained to identify the keywords. The keyword filters 430 exclude keywords that may not be meaningfully used by webpages, such as those keywords used only at a single domain or that are indiscriminately used within a single domain.

Thus, one keyword filter 430 identifies the number of domains at which a keyword is used. The number of domains that use a keyword is compared against a threshold, such as five or ten domains, and excludes the keyword from the set of eligible keywords 440 when the number of domains for the keyword is lower than the threshold. This filter permits excluding keywords that are not popular or frequently used by other domains, and are unlikely to be effective in meaningfully predicting the keyword at other webpages that are not labeled with the keyword. In the example shown in keyword data table 500 of FIG. 5, the page "sports.com/giantsgame/" includes a keyword for "Article ID 1358." This keyword does not appear in another keyword or domain, and is excluded as not being used by other domains as indicated in keyword data table 500. Though this keyword may be associated with a specific article, other keywords may be more prevalent across the domain but not used frequently at other domains, for example a slogan or the name of the domain itself.

Another keyword filter 430 excludes a set of webpages in a domain as associated with a keyword when that keyword is not used discriminatorily within the domain. This keyword filter determines the percentage of webpages for a specific domain that includes the keyword. For example, a domain may include a particular keyword in most or all of its webpages. In the keyword data table 500 shown in FIG. 5, the pages at SFNews.com each include the keyword San Francisco. This keyword filter determines the percentage of webpages at SFNews.com that use this keyword and compares the percentage to a threshold. When the percentage of pages at a domain that use the keyword exceeds a threshold, the keyword is excluded from association with pages in that domain. In this example, the keyword "San Francisco" is excluded from association with the pages at SFNews.com. As shown in the keyword data table 500, other keywords associated with the page may be maintained, for example the keyword "politician" for SFNews.com/politician and the keyword "Giants" for SFNews.com/giants. This permits other keywords to be maintained for the pages in the domain and analyzed.

Thus, among the various page filters 410 and keyword filters 430, the social networking system 140 may exclude a) webpages, b) keywords, and c) the association of a keyword with a webpage. When excluding the association of a keyword with a webpage, other keywords associated with the webpage may be maintained and eligible for training From the page filters 410 and keyword filters 430, a set of eligible keywords 440 and the pages associated with those keywords is identified. In the example of FIG. 5, these eligible keywords 440 are the keywords that have not been excluded, and include Politician, Giants, and San Francisco. However, "San Francisco" is not associated with the pages at the domain SFNews.com, because that association has been excluded by a keyword filter 430 as indicated above.

Using the eligible keywords 440, the keyword models are trained 450 to generate a set of keyword models 460. Each keyword model is trained to identify a specific keyword of the eligible keywords 440. In this example, a Baseball keyword model is trained to identify messages associated with the keyword Baseball, and the Politician keyword model is trained to identify messages associated with the keyword Politician. As noted above, the feature vectors for the eligible keywords may include the content of webpages including the keyword and/or the content of messages that link to the webpages.

Using the trained keyword models 460, the social networking system 140 can identify the likely keywords applicable to additional webpages linked by users, and in addition may predict keywords relevant to a user when posting a message.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying a set of webpages linked by a set of messages in a social networking system;
   identifying a plurality of keywords designated by the set of web pages;
   applying one or more exclusionary filters to identify a set of eligible keywords by excluding keywords in the plurality of keywords that meet at least one of the exclusionary filters;
   training a plurality of keyword classifiers, each keyword classifier corresponding to a single eligible keyword in the set of eligible keywords, the keyword classifier providing a classifier output indicating whether a message should be associated with the eligible keyword corresponding to the keyword classifier; and
   identifying one or more keywords for a subject message based on the classifier outputs of the plurality of keyword classifiers applied to the subject message.

2. The method of claim 1, wherein the one or more exclusionary filters include a frequency filter that excludes a keyword from the set of eligible keywords based on a percentage that the keyword is used by a set of webpages in a domain.

3. The method of claim 2, wherein the frequency filter excludes the keyword from the set of eligible keywords when the frequency that the keyword is used by the set of webpages in the domain is higher than a frequency threshold.

4. The method of claim 3, wherein the frequency threshold is seventy percent.

5. The method of claim 1, wherein the one or more exclusionary filters include a popularity filter that excludes a keyword from the set of eligible keywords based on a number of domains for the set of webpages that include the keyword.

6. The method of claim 5, wherein the popularity filter excludes the keyword from the set of eligible keywords when the number of domains for the set of webpages that include the keyword is less than 10.

7. The method of claim 1, wherein the keywords are predicted based on a webpage linked in the subject message.

8. The method of claim 1, wherein the subject message includes a link to a subject webpage, and the plurality of keyword classifiers are configured to provide the classifier output based on a webpage linked by the subject webpage.

9. The method of claim 1, wherein the subject message does not include a link to a webpage.

10. The method of claim 1, wherein the subject message is received from a composing user, and further comprising suggesting to the composing user that the composing user include the one or more identified keywords in the subject message.

11. The method of claim 1, further comprising identifying one or more topics for the subject message based on the one or more identified keywords for the subject message.

12. The method of claim 1, further comprising identifying one or more social networking objects for the subject message based on the one or more identified keywords for the subject message.

13. A non-transitory computer-readable medium comprising
   instructions for execution by a processor, the instructions causing the processor to perform steps of:
   identifying a set of webpages linked by a set of messages in a social networking system;
   identifying a plurality of keywords designated by the set of web pages;
   applying one or more exclusionary filters to identify a set of eligible keywords by excluding keywords in the plurality of keywords that meet at least one of the exclusionary filters;
   training a plurality of keyword classifiers, each keyword classifier corresponding to a single eligible keyword in the set of eligible keywords, the keyword classifier providing a classifier output indicating whether a message should be associated with the eligible keyword corresponding to the keyword classifier; and
   identifying one or more keywords for a subject message based on the classifier outputs of the plurality of keyword classifiers applied to the subject message.

14. The non-transitory computer-readable medium of claim 13, wherein the one or more exclusionary filters include a frequency filter that excludes a keyword from the set of eligible keywords based on a percentage that the keyword is used by a set of webpages in a domain.

15. The non-transitory computer-readable medium of claim 14, wherein the frequency filter excludes the keyword from the set of eligible keywords when the frequency that the keyword is used by the set of webpages in the domain is higher than a frequency threshold.

16. The non-transitory computer-readable medium of claim 15, wherein the frequency threshold is seventy percent.

17. The non-transitory computer-readable medium of claim 13, wherein the one or more exclusionary filters include a popularity filter that excludes a keyword from the set of eligible keywords based on a number of domains for the set of webpages that include the keyword.

18. The non-transitory computer-readable medium of claim 17, wherein the popularity filter excludes the keyword from the set of eligible keywords when the number of domains for the set of webpages that include the keyword is less than 10.

19. The non-transitory computer-readable medium of claim 13, wherein the keywords are predicted based on a webpage linked in the subject message.

20. The non-transitory computer-readable medium of claim 13, wherein the subject message includes a link to a subject webpage, and the plurality of keyword classifiers are configured to provide the classifier output based on a webpage linked by the subject webpage.

21. The non-transitory computer-readable medium of claim 13, wherein the subject message does not include a link to a webpage.

22. The non-transitory computer-readable medium of claim 13, wherein the subject message is received from a composing user, and the steps further comprising suggesting to the composing user that the composing user include the one or more identified keywords in the subject message.

23. The non-transitory computer-readable medium of claim 13, the steps further comprising identifying one or more topics for the subject message based on the one or more identified keywords for the subject message.

24. The non-transitory computer-readable medium of claim 13, the steps further comprising identifying one or more social networking objects for the subject message based on the one or more identified keywords for the subject message.

\* \* \* \* \*